(12) United States Patent
Spiss et al.

(10) Patent No.: US 11,660,611 B2
(45) Date of Patent: May 30, 2023

(54) CENTRIFUGAL PROCESSING UNIT INCLUDING A BLOCKING ELEMENT

(71) Applicant: TECAN TRADING AG, Mannedorf (CH)

(72) Inventors: Markus Spiss, Zurich (CH); Adrian Sager, Mannedorf (CH); Fred Schinzel, Mannedorf (CH); Markus Wolf, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 503 days.

(21) Appl. No.: 16/620,822

(22) PCT Filed: May 24, 2018

(86) PCT No.: PCT/EP2018/063612
§ 371 (c)(1),
(2) Date: Dec. 9, 2019

(87) PCT Pub. No.: WO2019/001855
PCT Pub. Date: Jan. 3, 2019

(65) Prior Publication Data
US 2020/0139383 A1  May 7, 2020

(30) Foreign Application Priority Data
Jun. 27, 2017 (EP) .................................... 17178113

(51) Int. Cl.
*B04B 5/04* (2006.01)
(52) U.S. Cl.
CPC ................................ *B04B 5/0421* (2013.01)

(58) Field of Classification Search
CPC ................ B04B 5/0421; B01L 3/5021; G01N 2035/00495
(Continued)

(56) References Cited

U.S. PATENT DOCUMENTS 3,722,789 A  3/1973 Kennedy
3,951,334 A * 4/1976 Fleming ................ B04B 5/0421
494/20
(Continued)

FOREIGN PATENT DOCUMENTS

DE  2831156 A1  1/1980

OTHER PUBLICATIONS

International Search Report and Written Opinion for corresponding PCT application No. PCT/EP2018/063612, dated Jul. 24, 2018.

*Primary Examiner* — Shuyi S. Liu
(74) *Attorney, Agent, or Firm* — Notaro, Michalos & Zaccaria P.C.

(57) ABSTRACT

A centrifugal processing unit for directing the movement of substances within a sample processing cartridge, the centrifugal processing unit having a rotor at least one accommodation for receiving the sample processing cartridge, and a rotor drive for rotating the at least one rotor about a respective rotor axis to create the centrifugal force. The centrifugal processing unit has a blocking element allowing the free pivoting motion of the at least one accommodation in a release position when the rotor is rotated in a first direction and preventing the free pivoting motion in a blocking position, when the rotor is rotated in the opposite direction.

15 Claims, 6 Drawing Sheets

(58) Field of Classification Search
USPC .................................................. 494/16, 20
See application file for complete search history.

(56) References Cited

U.S. PATENT DOCUMENTS

| | | | |
|---|---|---|---|
| 4,236,666 A | 12/1980 | Aeschlimann et al. | |
| 2013/0288873 A1* | 10/2013 | Barbee | G01N 35/1011 494/9 |
| 2015/0166208 A1* | 6/2015 | Miyauchi | B65B 69/00 53/492 |

* cited by examiner

CENTRIFUGAL PROCESSING UNIT INCLUDING A BLOCKING ELEMENT

TECHNICAL FIELD OF THE INVENTION

The current invention relates to a centrifugal processing unit for directing the movement of substances within a sample processing cartridge.

DESCRIPTION OF THE RELATED ART

Such a centrifugal processing unit is disclosed in U.S. Pat. No. 4,236,666. It comprises two magazines for several sample containers, wherein the magazines are arranged on arms that extend outwards from an axis of rotation, opposite of each other. Each magazine is rotatable about a respective axle and is slidable along said axle. On each arm, on one side of the respective magazine, a locking pin is arranged and each magazine comprises a corresponding recess for said locking pin. If the axis of rotation is rotated in one direction, each magazine abuts on the side of the arm without a locking pin and can rotate about its axle. If the axis of rotation is rotated in the opposite direction, each magazine slides along its axle and abuts on the side of the arm with a locking pin, thus preventing its rotation about its axle. The sliding and abutting creates an additional unwanted force vector.

SUMMARY OF THE INVENTION

It is therefore a task of the current invention to provide a centrifugal processing unit for directing the movement of substances within a sample processing cartridge by means of which additional unwanted force vectors are prevented.

This problem is solved by a centrifugal processing unit with the features of claim 1. Further embodiments of the centrifugal processing unit, a centrifugal processing system as well as a process for directing the movement of substances within a sample processing cartridge are defined by the features of further claims.

A centrifugal processing unit for directing the movement of substances within a sample processing cartridge comprises at least one rotor with at least one accommodation for receiving the sample processing cartridge, the at least one accommodation only allowing a free pivoting motion of the cartridge about a respective pivot axis, wherein each pivot axis is orthogonal to the rotor axis and to a respective force vector of a centrifugal force, at least one rotor drive for rotating the at least one rotor about a respective rotor axis to create the centrifugal force, a control for accelerating and decelerating the at least one rotor, at least one blocking element, allowing the free pivoting motion of the cartridge, respectively of the accommodation in a release position and preventing the free pivoting motion in a blocking position, wherein the blocking element can be moved into the release position when the rotor is rotated in a first direction of rotation and wherein the blocking element can be moved into the blocking position when the rotor is rotated in a second direction of rotation, opposite to the first direction of rotation.

As the blocking element is small in mass, in relation to the mass of the rotor, the accommodations and the cartridges, there are no or only small vibrations due to its movement from the release position into the blocking position. Also, the rotor can be rotated slowly in the beginning, during the time when the blocking element is moved from the release position to the blocking position.

After the blocking element reached the blocking position, the rotor can be accelerated.

This concept works with any number of rotor arms. There can be two, four, six, eight, ten, twelve or any even number of rotor arms. When the arms are evenly distributed around the rotor, the centrifuge is weight balanced. Alternatively, any odd number of rotor arms is possible together with a corresponding distribution around the rotor. The blocking element can block the pivoting motion of all accommodations or can only block the pivoting motion of a certain number of accommodations. It is possible to block the pivoting motion of every second position or the block the pivoting motion of a batch of adjacent accommodations. To create a symmetric load distribution, the accommodations opposite to each other with respect to the rotor, should be of the same design, i.e. their pivoting motions should be blocked or not simultaneously.

In another embodiment, the blocking element is arranged on the rotor. With the arrangement on the rotor, all blocking elements can be moved together. This is possible in the case, when the pivoting motion of every accommodation is blocked or when only part of them are blocked.

In a further embodiment, the at least one accommodation is adapted for receiving the sample processing cartridge in a first orientation and for receiving the sample processing cartridge in a second orientation, wherein the second orientation corresponds to an angular rotation of the sample processing cartridge about an axis parallel to the rotor axis. If a cartridge can be orientated in various directions in the accommodation, it is possible to create a multitude of force vectors acting on the cartridge resulting from the centrifugal force created during the rotation.

For example, the angular rotation is a rotation about an angle greater 0 to 180 degrees, particularly 90 degrees or 180 degrees. Usually, the sample processing cartridges are disc shaped, wherein in its intended use position, its width and height are a multiple of its thickness.

In another embodiment, the at least one accommodation comprises a frame for receiving the sample processing cartridge. Such a frame can be adapted to receive one specific cartridge or can be designed to be able to receive a variety of cartridges with similar receiving sections. Such a frame enables a bigger flexibility regarding the cartridges to be received.

In a further embodiment, the at least one accommodation comprises an abutment, which prevents the sample processing cartridge from pivoting over a predefined angle. A corresponding abutting element can be arranged on the sample processing cartridge or on the frame for receiving the sample processing cartridge. As the free pivoting motion allowing an angular deviation of 0 degrees to about 90 degrees, the design with an abutment allows the selective setting of the angular motion of the sample processing cartridge in the range of greater than 0 degrees to smaller than 90 degrees. With this, the content of the sample processing cartridge can be moved at an angle with respect to the orientation of the sample processing cartridge.

The features of the above-mentioned embodiments of the centrifugal processing unit can be used in any combination, unless they contradict each other.

A centrifugal processing system according to the invention for directing the movement of substances within a sample processing cartridge comprises a centrifugal processing unit according to one of the above-mentioned embodiments and at least one manipulator adapted to be able to arrange the sample processing cartridge in the at least one accommodation or to remove it therefrom. A manipulator prevents human handling errors. Additionally, in a clean environment, the manipulator allows the handling of the cartridges without the risk of contamination during the handling of the cartridges.

In an embodiment, the manipulator is adapted to be able to move the sample processing cartridge in any horizontal or vertical direction. The combination of the vertical and at least one horizontal movement allows the placement of the cartridges in the centrifugal processing unit and their removal therefrom. By transferring a cartridge from one accommodation to an accommodation opposite thereof, changes the orientation of the cartridge with respect to the rotor. The same change of orientation can be achieved by a rotation of the cartridge.

In a further embodiment, the manipulator is adapted to be able to perform an angular rotation of the sample processing cartridge about an axis parallel to the rotor axis. The change of orientation of the cartridge results in a change of the orientation of the force vector of the centrifugal force during the centrifugation of the corresponding cartridge.

For example, the angular rotation is a rotation about an angle greater than 0 degrees, particularly 90 degrees or 180 degrees. The rotation of the cartridge about 180 degrees allows to invert the force vector resulting from the applied centrifugal force.

According to another embodiment, the centrifugal processing system further comprises at least one additional station, wherein the at least one additional station can be selected from the group of loading/unloading station, sealing station, irradiation station (electromagnetic, radioactive), hating station (contact, convection) detection/quantification station and identification station or any other commonly known station for the treatment of the content of a sample processing cartridge or the handling of a sample processing cartridge. The incorporation of these additional stations provides a wide variety of options and allow a versatile use of the system. These stations can be arranged next to each other on a single base. Additionally, they can be allocated within an accessible housing. The housing can be removed or can be opened, partially of fully.

The loading and unloading can be at the same place or can be allocated at various places, i.e. a loading station and an unloading station. These stations can provide space for individual cartridges or for carriers for several cartridges. The loading station may also comprise a pipetting station, where substances, reagents, samples or reconstitution buffers can be added, mixed or transferred to respective compartments in the cartridges.

In the sealing station, the cartridges are sealed to prevent substances from leaving or entering the cartridges.

In the irradiation station, intermediates or final products can be exposed to any kind of irradiation. For example, the irradiation can be electromagnetic, such as light or heat, or radioactive.

In the heating station, intermediates or final products can be exposed to any kind of heat, for example, through contact or through convection. For example, the heat can be kept constant in an isothermal incubator, for example in the range of 4 to 98 degrees centigrade. In a gradient incubator or Thermocycler, any heating or cooling gradient can be combined with each other or with temperature plateaus.

In the detection/quantification station, intermediates or final products can be detected or quantified by any kind of optical or electronical detection/quantification.

In the identification station, the cartridges can be identified by means of one-dimensional or two-dimensional bar code scanners, matrix scanners, RFID scanners or imaging systems.

The features of the above-mentioned embodiments of the centrifugal processing system can be used in any combination, unless they contradict each other.

A process for directing the movement of substances within a sample processing cartridge according to the invention comprises the steps of:
Providing a centrifugal processing unit according to one of the above-mentioned embodiments;
Inserting a sample processing cartridge in the at least one accommodation;
Rotating the at least one rotor about a respective rotor axis in the first direction of rotation, thereby moving the movable element of the blocking element in the release position, thereby allowing a free pivoting motion of the inserted sample processing cartridge and thereby creating a first force vector in a first direction with respect to the inserted sample processing cartridge;
Stopping the rotation and thereby allowing the sample processing cartridge to return to its initial position;
Rotating the at least one rotor in the second direction of rotation, opposite to the first direction of rotation, thereby moving the movable element of the blocking element in the blocking position, thereby preventing a free pivoting motion of the inserted sample processing cartridge and thereby creating a second force vector in a second direction with respect to the inserted sample processing cartridge.

In a further embodiment, the process further comprises the steps of:
Removing the sample processing cartridge from the at least one accommodation;
Rotating the sample processing cartridge about an axis parallel to the rotor axis;
Inserting the sample processing cartridge in the at least one accommodation;
thereby enabling the creation of a third force vector in a third direction with respect to the inserted sample processing cartridge when the at least one rotor is rotated in the second direction of rotation.

The advantages of the centrifugal processing unit or the centrifugal processing system apply as well to the process for directing the movement of substances within a sample processing cartridge.

In a further embodiment, the process further comprises the steps of:
Positioning of the sample processing cartridge in an at least one additional station before or after inserting the sample processing cartridge in the accommodation, wherein the at least one additional station can be selected from the same group as the one from the centrifugal processing system.

According to a further embodiment, the inserting, the removing, the rotating and/or the positioning of the sample processing cartridge is performed by at least one manipulator.

According to a further embodiment, the free pivoting motion of the sample processing cartridge is partially restricted by providing the accommodation with an abutment before the at least one rotor is rotated. The abutment can be provided initially or just before the rotation of the rotor. It is also possible to provide such angularly restricted accommodations from the beginning, i.e. as factory setting or to place an abutment in a respective accommodation at the latest, just before the rotor is rotated by hand or by manipulator. It is also possible to allocate an abutment at the accommodation between these two points in time.

The features of the above-mentioned embodiments of the process for directing the movement of substances within a sample processing cartridge can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 a side view of a centrifugal processing unit according to the invention.

DETAILED DESCRIPTION OF THE INVENTION

Figure 1:
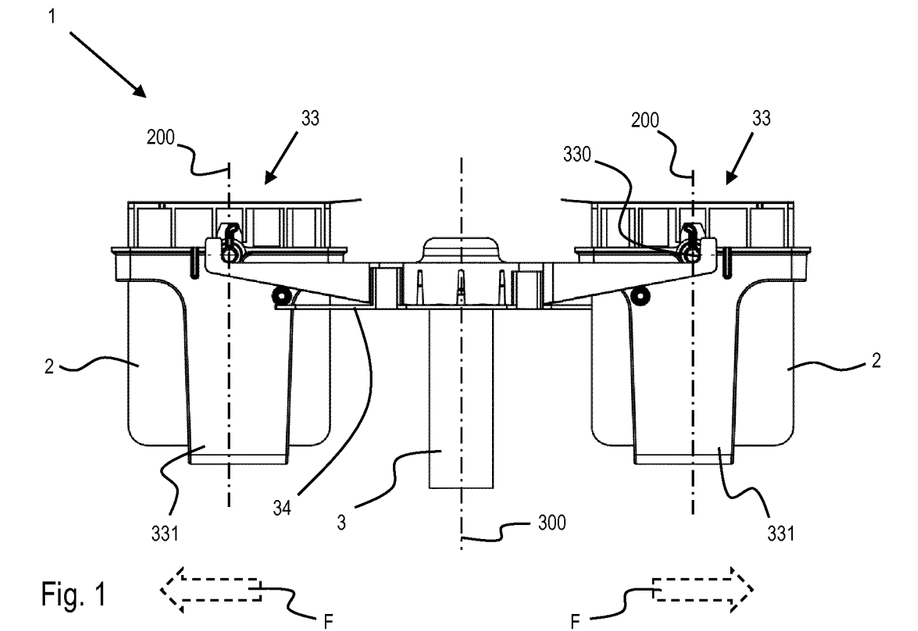
Figure 2:
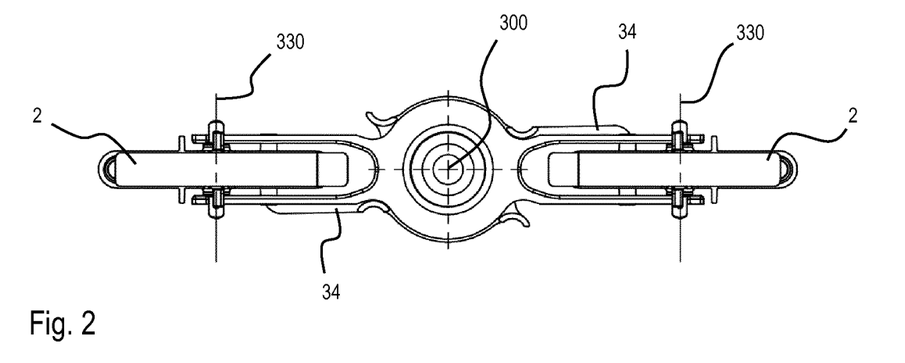
FIG. 2 a top view of the centrifugal processing unit of FIG. 1.
Figure 5:
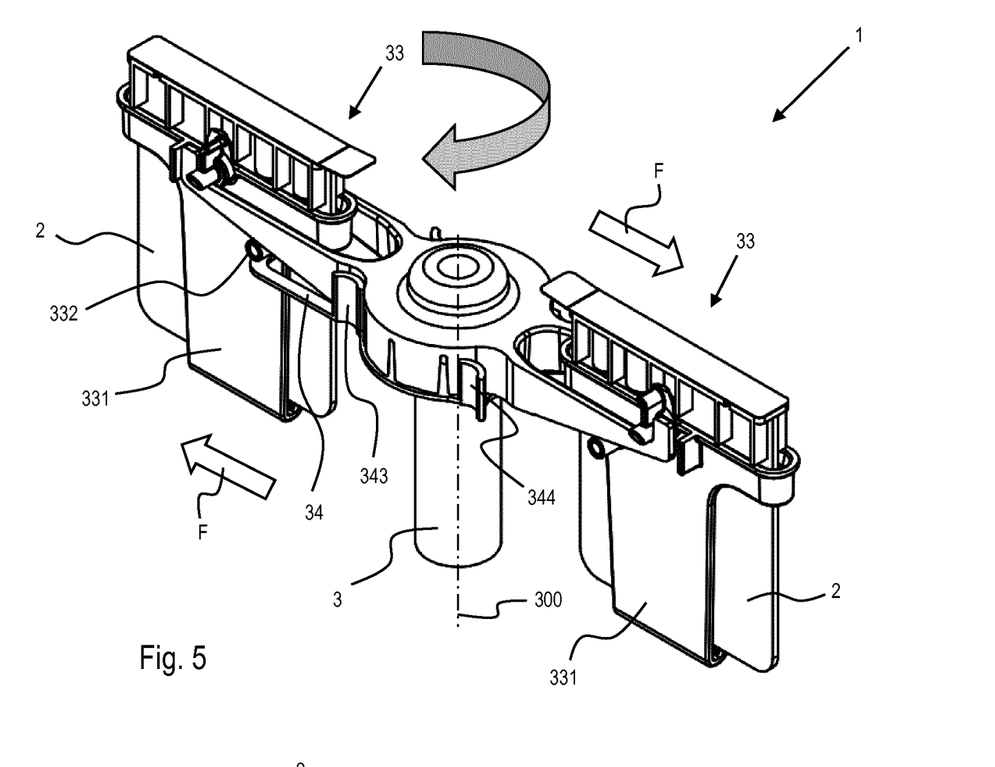
FIG. 5 a perspective view of the centrifugal processing unit of FIG. 1 during the rotation in a second direction, opposite to the first direction.
Figure 7:
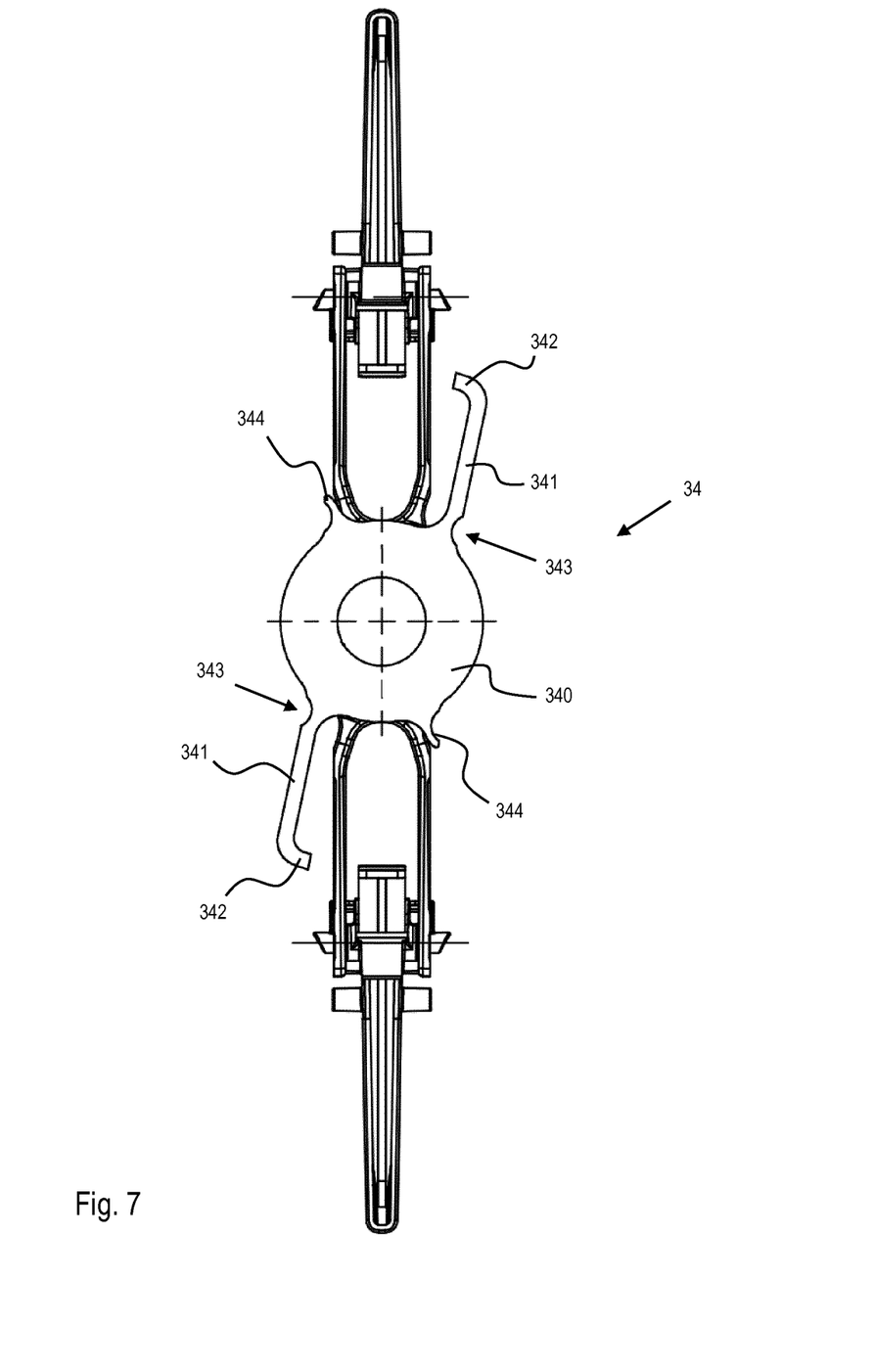
FIG. 7 a bottom view of the centrifugal processing unit of FIG. 1.

FIG. 1 shows a side view and FIG. 2 shows a top view of a centrifugal processing unit 1 according to the invention. The centrifugal processing unit 1 for directing the movement of substances within a sample processing cartridge 2 comprises a rotor 3 for receiving the sample processing cartridge 2, at least one rotor drive (not shown) for rotating the at least one rotor 3 about a respective rotor axis 300 to create a centrifugal force F, a control (not shown) for accelerating and decelerating the at least one rotor 3. The rotor 3 comprises two arms that extend laterally from the central rotor axis 300 on opposite sides from the rotor axis 300. The arms are rotatably mounted on the rotor tip. A central disk connects the two arms with each other. The centre of the central disk is arranged on the central rotor axis 300. The arms of the rotor are rotatable about the central rotor axis 300. A bearing, i.e. a ball bearing or bush bearing allowing a relative rotation between the rotor 3 and the rotor arms. The centrifugal processing unit 1 further comprises two accommodations 33 for receiving the sample processing cartridge 2. The accommodations 33 are arranged on the rotor 3, wherein each accommodation 33 has a first configuration and a second configuration. The first configuration allows a free pivoting motion of the received sample processing cartridge 2 about a respective pivot axis 330 in a first configuration. The pivot axis 330 is orthogonal to the rotor axis 300 and to the respective force vector F of the centrifugal force. The second configuration prevents the free pivoting motion of the received cartridge about the respective pivot axis 330. The two accommodations 33 are allocated one at each of the free ends of the two rotor arms. Each accommodation 33 comprises a frame 331 for receiving the sample processing cartridge 2. The frame of each accommodation is adapted for receiving the sample processing cartridge 2 in a first orientation and for receiving the sample processing cartridge 2 in a second orientation, wherein the second orientation corresponds to an angular rotation of 180 degrees of the sample processing cartridge 2 about a central axis 200 parallel to the rotor axis 300. All accommodations 33 are designed identically. The centrifugal processing unit 1 further comprises a blocking element 34 assigned to each accommodation. The blocking element 34 allows the free pivoting motion of the cartridge 2 in the first configuration and prevents the free pivoting motion in the second configuration. Details of the blocking element 34 are shown in the bottom view of the centrifugal processing unit 1 of FIG. 7. The blocking element 34 comprises a disk 340 that is arranged about the rotor 3 or the rotor shaft respectively. The disk 340 is fixed to the rotor shaft and thus, a relative rotation between the rotor shaft and the blocking element 34 is prevented. The blocking element 34 further comprises arms 341 that extend laterally outward from the disk in a substantially radial direction, on opposite sides of the disk 340. At the free end of each arm 341, a blocker 342 is arranged. Each blocker 342 extends sideways from its respective arm 341. In the region of each blocking element arm 341, adjacent to the disk 340, a stopper 343 is arranged. The stopper 343 extends from the disk in the direction of the rotor axis 300 and a further stopper 344 extends from the disk 340 in the same direction with respect to the rotor axis 300 as the aforementioned stoppers 343. Additionally, the stoppers 344 extend from the disk outwards in a substantially radial direction. All stoppers 343, 344, in their intended use position, extend sideways from the rotor arms and can abut the respective rotor arm sideways, as can be seen in FIG. 5. In the shown embodiment, when the rotor 3 is rotated in the clockwise direction, the blocking element 34 rotates together with the rotor 3. Due to the inertia, the rotor arms don't move or only move a little. When the stoppers 343 abut the rotor arms sideways, the rotor arms turn together with the rotor 3. At the same time, each respective blocker 342 engages with a respective protrusion 332 on the frame 331 and thus prevents the frame 331 from pivoting about the pivot axis 330. When the rotor is rotated in the counter-clockwise direction, the blocking element 34 rotates and the rotor arms, due to the inertia, don't move or move only a little. When the further stoppers 344 abut the rotor arms sideways, the rotor arms turn together with the rotor 3. As all blocking elements 34 are disengaged with the corresponding protrusion 332 of the frame 331, the frame 331 can pivot freely about the respective pivot axis 330, as shown in FIG. 3.

Figure 3:
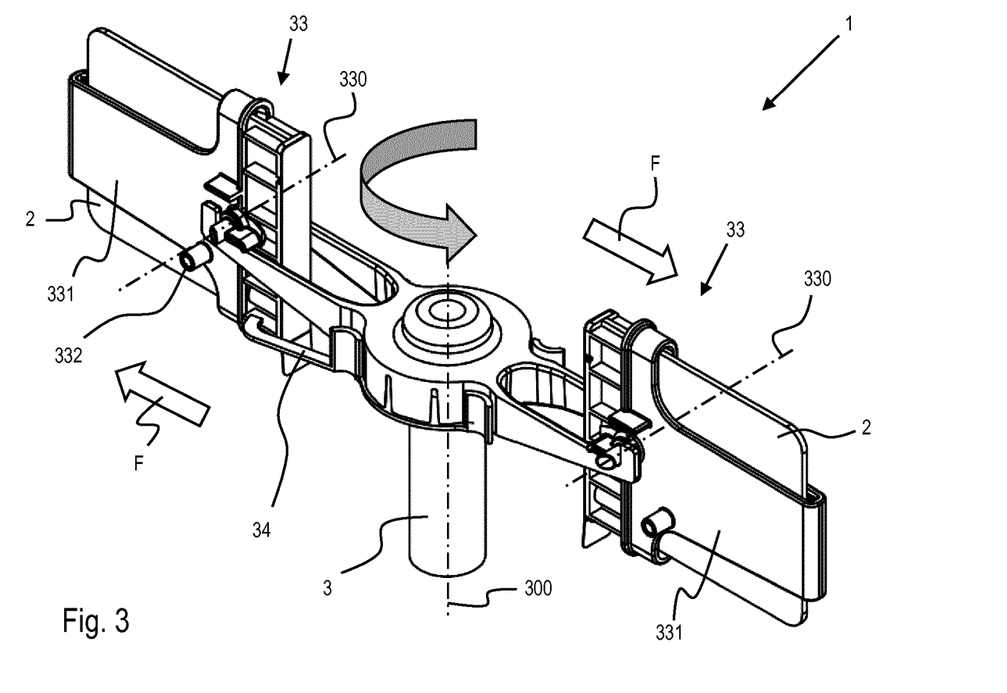
FIG. 3 a perspective view of the centrifugal processing unit of FIG. 1 during the rotation in a first direction.

FIG. 3 shows the centrifugal processing unit of FIG. 1 during the rotation in a first counter-clockwise direction. When turned in the first direction, each blocking element is in the first configuration and allows a pivoting motion of the respective cartridge 2. Due to the centrifugal force F, the frame 331 together with the therein received cartridge 2 of each accommodation 33 perform a pivoting motion about the pivot axis 330. In the depicted case, the angular deflection of the cartridge in the rotated state with respect to its position of rest is about 90 degrees.

Figure 4:
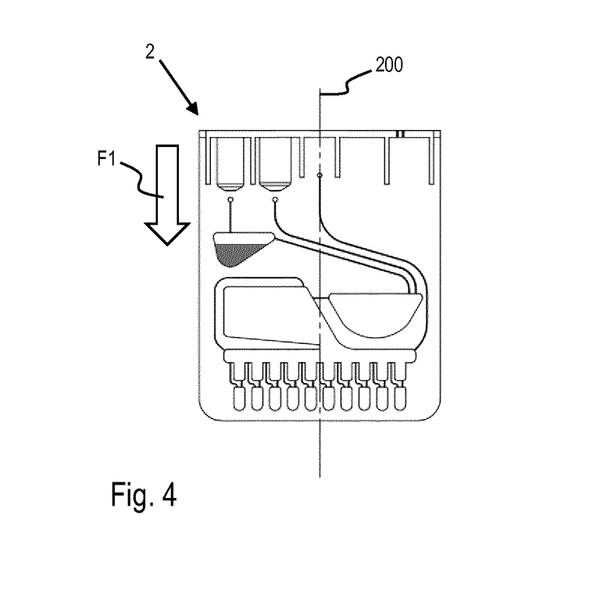
FIG. 4 a sample processing cartridge during the rotation in the first direction.

FIG. 4 shows a sample processing cartridge 2 during the rotation of the rotor 3 in the first direction. For a better visibility, only the cartridge 2 is shown. During the rotation of the rotor 3 in the first direction, the centrifugal force F acts on the cartridge in a first direction, resulting in a first force vector F1 acting on substrates to be moved within the sample processing cartridge 2 and directing them in the first direction. With respect to the orientation of the cartridge in its position of rest, the first force vector points downwards. Thus, substances that have been inserted into the cartridge at its top, are moved downwards. During the rotation of the rotor 3 in the first direction, the resulting force vector always points downwards, even when the cartridge is rotated about its central axis 200.

Figure 6:
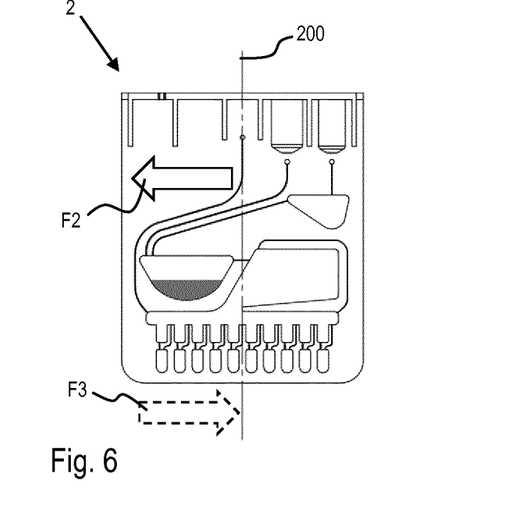
FIG. 6 the sample processing cartridge during the rotation in the second direction.

FIG. 6 shows a sample processing cartridge 2 during the rotation in a second direction. For a better visibility, only the cartridge 2 is shown. During the rotation of the rotor 3 in the second direction, each blocking element 34 is in its second configuration and prevents a pivoting motion of the therein received cartridge 2. Thus, the centrifugal force F acts on the cartridge in a second direction, resulting in a second force vector F2 acting on substrates to be moved within the sample processing cartridge 2 and directing them in the second direction. With respect to the orientation of the cartridge in its position of rest, the second force vector F2 points to one side. Therefore, substances within the cartridge are moved to that side. When the cartridge is rotated about its central axis 200, during the rotation of the rotor 3 in the second direction, the centrifugal force F acts on the cartridge in a third direction, essentially opposite to the second direction, resulting in a third force vector F3 acting on the substrates in the cartridge and moving them in the third direction. With respect to the orientation of the cartridge in its position of rest, the third force vector F3 points essentially to the opposite direction than the second force vector F2. Thus, substrates within the cartridge are moved towards that side. If a substrate is to be moved down, right, down and left within a cartridge, the cartridge would be inserted first in a first orientation in an accommodation. Then, the rotor is rotated counter-clockwise, so that the accommodation 33 is not blocked and the resulting first force vector F1 acts downwards with respect to the initial orientation of the cartridge 2. Then, the rotor 3 is stopped and subsequently rotated in the opposite direction, i.e. clockwise. Thus, the pivoting motion of the cartridge 2 is prevented and the resulting second force vector F2 acts to the right with respect to the initial orientation of the cartridge 2. Then the rotor is stopped again and rotated in the opposite direction, resulting in a first force vector F1 acting on the cartridge, i.e. downwards. After the rotor is stopped, the cartridge 2 is extracted from the accommodation 33, is rotated 180 degrees about its central axis 200 and again inserted into the accommodation 33. Then the rotor 3 is rotated in the clockwise direction, thus, the pivoting motion of the accommodation 33 is blocked, resulting in a third force vector F3 acting on the cartridge 2, i.e. to the left. Like this, any kind of path through the cartridge 2 can be realised.

Figure 8:
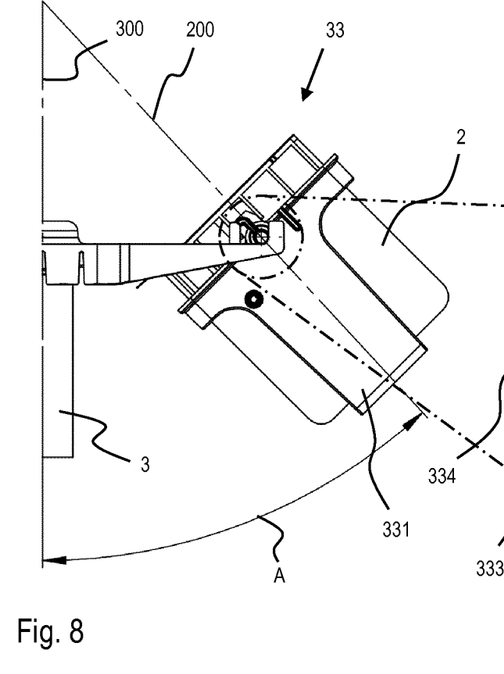
FIG. 8 a side view of a further embodiment of the centrifugal processing unit.
Figure 9:
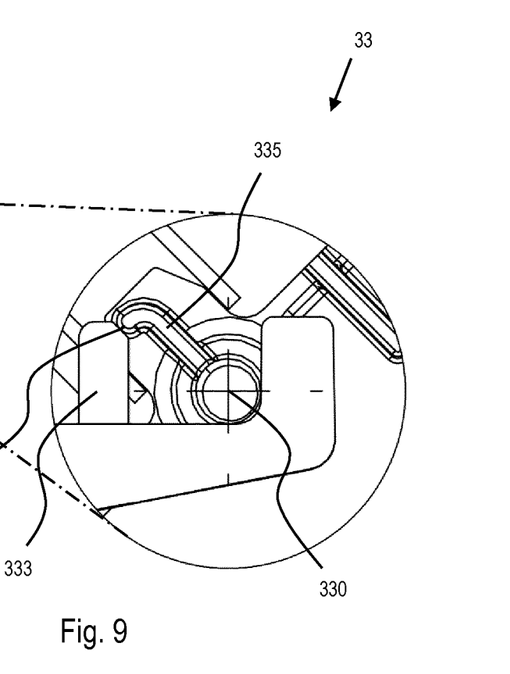
FIG. 9 a detail view of FIG. 8.

FIG. 8 shows a partial side view of a centrifugal processing unit 1 with a restricted angular deviation at the accommodation 33 and FIG. 9 shows a detail of the accommodation 33 of FIG. 6. On the rotor arm, close to the pivot axis 330, an abutment 333 is arranged. The abutment 333 extends upwards from the rotor arm and comprises an abutment surface 334 at its upper end region. The abutment surface 334 is designed for contacting an abutting element 335 that is arranged on the frame 331 of the accommodation 33. The abutting element 335 extends radially upwards from the pivot axis 330, in the static condition, when the rotor 3 is not rotating. In the static condition, there is a free space between the abutment 333 and the abutting element 335. When the rotor 3 rotates, the frame 331 pivots about the pivot axis 330 and the abutting element 335 performs a pivoting motion and thus the free space is reduced until the abutting element 335 touches the abutment 333. The bigger the free space in the static condition, the bigger is the possible angular deviation of the frame 331 with respect to the rotor, i.e. the angle A about which the cartridge can be pivoted. The smaller the height of the abutment 333, the bigger the free space in the static condition. With this combination of abutment 333 and abutting element 335, angular deviations from bigger than 0 degrees and smaller than 90 degrees can be realised.

Figure 10:
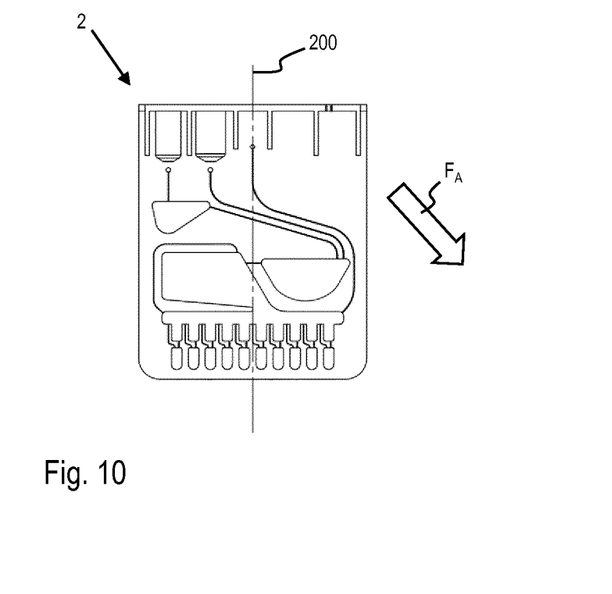
FIG. 10 a sample processing cartridge during the rotation in the first direction in the centrifugal processing unit of FIG. 8.

FIG. 10 shows a sample processing cartridge received in the pivot accommodation of FIG. 8 with a resulting angular force vector $F_A$ of about 45 degrees.

Different abutments 333 at different rotor arms enable different resulting force vectors acting on the cartridge 2 inserted in the respective frame. By placing a cartridge 2 subsequently in different positions of the rotor 3, i.e. in different frames of the centrifugal processing unit 1, different resulting force vectors can be applied correspondingly on said cartridge 2. This increases the possible paths that a liquid can take within a cartridge.

Figure 11:
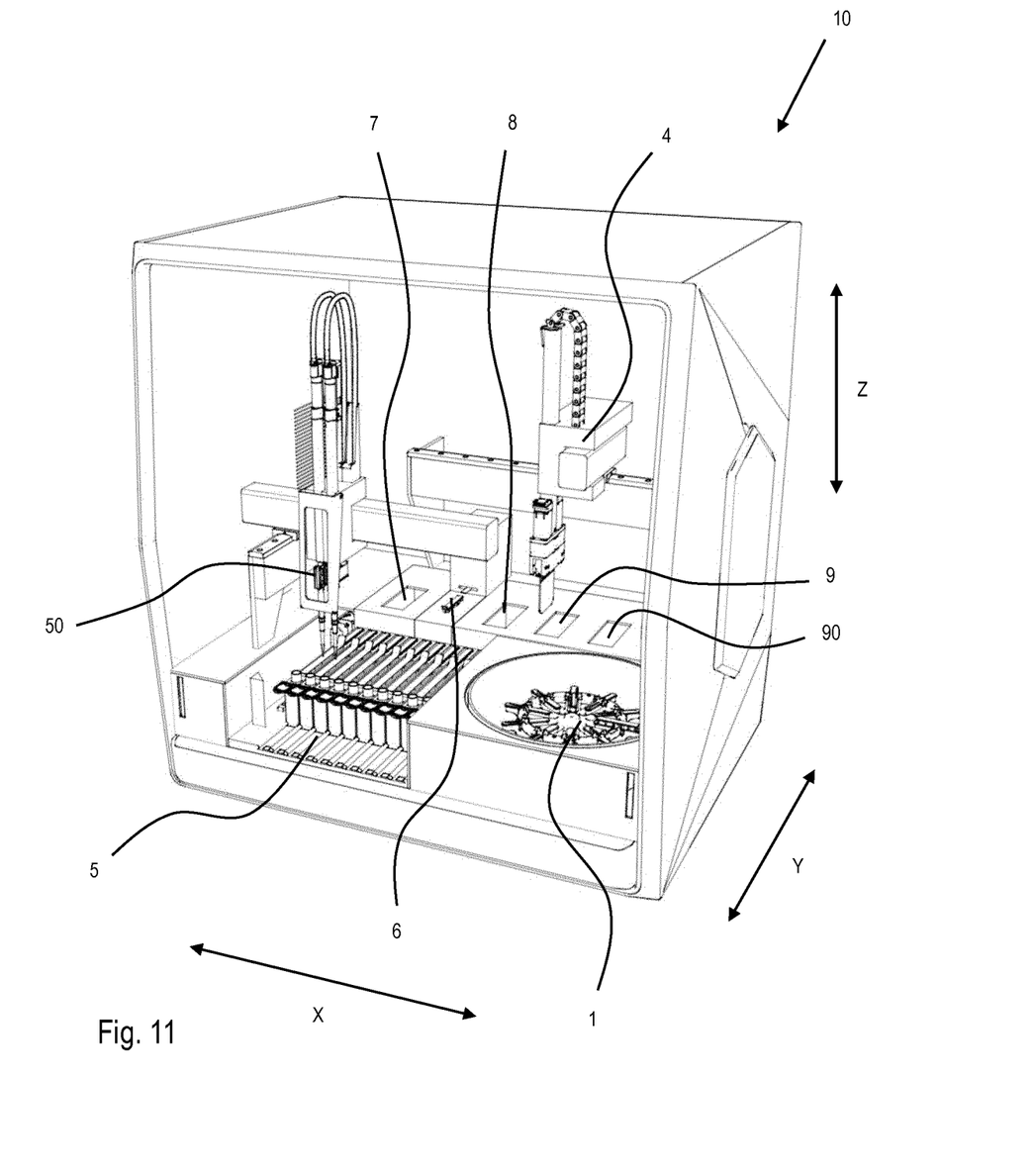
FIG. 11 a perspective view of a centrifugal processing system with a centrifugal processing unit according to the invention.

FIG. 11 shows a centrifugal processing system with a centrifugal processing unit 1. The centrifugal processing unit 1 is mounted on a base. A manipulator 4, a loading/unloading station 5, a sealing station 6, an irradiation station 7, a heating station 8, a detection/quantification station 9 and an identification station 90 are mounted on the same base. The base with the manipulator and all the stations are enclosed by a housing. The inside of the housing can be accessed by means of a hinged lid. This is favourable for maintenance. During normal operation, the loading/unloading station 5 is the only connection between the inside and the surrounding. The manipulator 4 is adapted to insert/remove a sample processing cartridge 2 in/from the centrifugal processing unit 1. The manipulator 4 can perform horizontal movements along horizontal axes X, Y and vertical movements along a vertical axis Z. Additionally, the manipulator 4 can rotate a cartridge about the vertical axis Z.

| REFERENCE SIGNS LIST | |
|---|---|
| 1 | Centrifugal processing unit |
| 10 | Centrifugal processing system |
| 2 | Sample processing cartridge |
| 200 | Central axis |
| 3 | Rotor |
| 300 | Rotor axis |
| 33 | Accommodation |
| 330 | Pivot axis |
| 331 | Frame |
| 332 | Protrusion |
| 333 | Abutment |
| 334 | Abutting surface |
| 335 | Abutting element |
| 34 | Blocking element |
| 340 | Disk |
| 341 | Arm |
| 342 | Blocker |
| 343 | Stopper |
| 344 | Stopper |
| 4 | Manipulator |

-continued

REFERENCE SIGNS LIST

| | |
|---|---|
| 5 | Loading station |
| 50 | Pipetting unit |
| 6 | Sealing station |
| 7 | Irradiation station |
| 8 | Heating station |
| 9 | detection/quantification station |
| 90 | identification station |
| F | Centrifugal force |
| F1 | Force vector |
| F2 | Force vector |
| F3 | Force vector |
| A | Angle |
| $F_A$ | Force vector |

The invention claimed is:

1. A centrifugal processing unit (1) for directing the movement of substances within a sample processing cartridge (2), the centrifugal processing unit (1) comprising:
   at least one rotor (3) with at least one accommodation (33) for receiving the sample processing cartridge (2), the at least one accommodation (33) only allowing a free pivoting motion of the cartridge (2) about a respective pivot axis (330), wherein each pivot axis (330) is orthogonal to a rotor axis (300) of the at least one rotor (3) and to a respective force vector (F1, F2, F3) of a centrifugal force (F),
   at least one rotor drive for rotating the at least one rotor (3) about the respective rotor axis (300) to create the centrifugal force (F),
   a control for accelerating and decelerating the at least one rotor (3),
   at least one blocking element (34), allowing the free pivoting motion of the cartridge (2) in a release position and preventing the free pivoting motion in a blocking position, wherein
   the at least one blocking element (34) can be moved into the release position when the rotor (3) is rotated in a first direction of rotation and wherein the at least one blocking element (34) can be moved into the blocking position when the rotor (3) is rotated in a second direction of rotation, opposite to the first direction of rotation, characterized in that
   each accommodation (33) is allocated on a free end of a rotor arm, wherein the blocking element (34) comprises a disk (340) with arms (341) with blockers (342) and with stoppers (343,344), wherein the disk (340) is fixed to the rotor shaft, wherein the arms (341) extend laterally outward from the disk in a substantially radial direction, on opposite sides of the disk (340), wherein at the free end of each arm (341), one blocker (342) is arranged and designed to engage with a respective protrusion (332) of the at least one accommodation (33), wherein the stoppers (343,344) extend from the disk (340) in the direction of the rotor axis (300) and are designed to abut the respective rotor arm sideways.

2. The centrifugal processing unit (1) according to claim 1, wherein the blocking element (34) is arranged on the rotor (3).

3. The centrifugal processing unit (1) according to claim 1, wherein the at least one accommodation (33) being adapted for receiving the sample processing cartridge (2) in a first orientation and for receiving the sample processing cartridge (2) in a second orientation, wherein the second orientation corresponds to an angular rotation of the sample processing cartridge (2) about a central axis (200) parallel to the rotor axis (300).

4. The centrifugal processing unit (1) according to claim 3, wherein the angular rotation is greater 0 degrees and wherein the angular rotation is up to 180 degrees.

5. The centrifugal processing unit (1) according to claim 1, wherein the at least one accommodation (33) comprises a frame (331) for receiving the sample processing cartridge (2).

6. The centrifugal processing unit (1) according to claim 1, wherein the at least one accommodation (33) comprises an abutment (333), which prevents the sample processing cartridge (2) from pivoting over a predefined angle (A).

7. A centrifugal processing system (10) for directing the movement of substances within a sample processing cartridge (2), the centrifugal processing system (10) comprising:
   a centrifugal processing unit (1) according to claim 1, and
   at least one manipulator (4) adapted to be able to arrange the sample processing cartridge (2) in the at least one accommodation (33) or to remove it therefrom.

8. The centrifugal processing system (10) according to claim 7, wherein the manipulator (4) is adapted to be able to move the sample processing cartridge (2) in any horizontal or vertical direction (X, Y, Z).

9. The centrifugal processing system (10) according to claim 7, wherein the manipulator (4) is adapted to be able to perform an angular rotation of the sample processing cartridge (2) about an axis (Z) parallel to the rotor axis (300).

10. The centrifugal processing system (10) according to claim 9, wherein the angular rotation is a rotation about an angle greater than 0 degrees.

11. The centrifugal processing system (10) according to claim 7, wherein the centrifugal processing system (10) further comprises at least one additional station, wherein the at least one additional station can be selected from the group of loading/unloading station (5), sealing station (6), irradiation station (7), heating station (8), detection/quantification station (9) and identification station (90) or any other commonly known station for the treatment of the content of a sample processing cartridge (2) or the handling of a sample processing cartridge (2).

12. A process for directing the movement of substances within a sample processing cartridge (2), the process comprising the steps of:
   Providing a centrifugal processing unit (1) according to claim 1;
   Inserting a sample processing cartridge (2) in the at least one accommodation (33);
   Rotating the at least one rotor (3) about a respective rotor axis (300) in the first direction of rotation, thereby moving the blocking element (34) in the release position, thereby allowing a free pivoting motion of the at least one accommodation (33) and thereby creating a first force vector (F1) in a first direction with respect to the inserted sample processing cartridge (2);
   Stopping the rotation and thereby allowing the sample processing cartridge (2) to return to its initial position;
   Rotating the at least one rotor (3) in the second direction of rotation, opposite to the first direction of rotation, thereby moving the blocking element (34) in the blocking position, thereby preventing a free pivoting motion of the at least one accommodation (33) and thereby creating a second force vector (F2) in a second direction with respect to the inserted sample processing cartridge (2), Removing the sample processing cartridge (2) from the at least one accommodation (33);

Rotating the sample processing cartridge (2) about an axis (Z) parallel to the rotor axis (300);

Inserting the sample processing cartridge (2) in the at least one accommodation (33);

thereby enabling the creation of a third force vector (F3) in a third direction with respect to the sample processing cartridge (2) when the at least one rotor (3) is rotated in the second direction of rotation.

13. The process according to claim 12, wherein the process further comprising the steps of:

Positioning of the sample processing cartridge (2) in an at least one additional station before or after inserting the sample processing cartridge (2) in the at least one accommodation (33), wherein the at least one additional station can be selected from the group of loading/unloading station (5), sealing station (6), irradiation station, heating station, detection/quantification station, unloading station, identification station.

14. The process according to claim 12, wherein the free pivoting motion of the sample processing cartridge (2) is partially restricted by providing the at least one accommodation (33) with an abutment (333) before the at least one rotor (3) is rotated.

15. The centrifugal processing unit (1) according to claim 4, wherein the angular rotation is 90 degrees or wherein the angular rotation is 180 degrees.

\* \* \* \* \*